Figure 1:
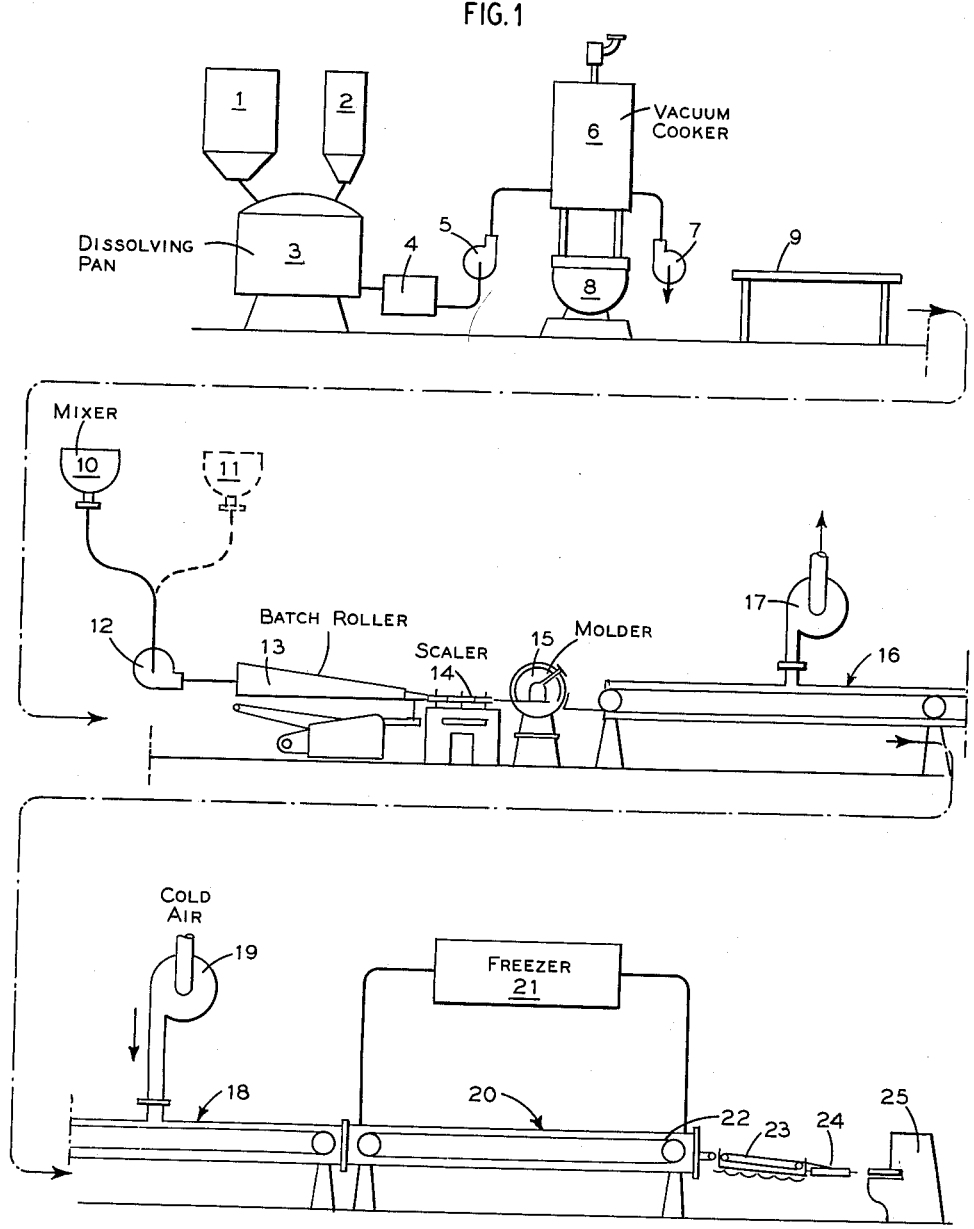

March 21, 1961 C. W. HELLER 2,976,155
METHOD OF MAKING FROZEN CONFECTION
Filed Jan. 30, 1959

INVENTOR.
Charles W. Heller
BY
Irving Seidman
ATTORNEY

United States Patent Office 2,976,155
Patented Mar. 21, 1961

2,976,155
METHOD OF MAKING FROZEN CONFECTION

Charles W. Heller, Belgradplatz 3, Vienna, Austria, assignor of one-half to John Heller, White Plains, N.Y.

Filed Jan. 30, 1959, Ser. No. 790,169

7 Claims. (Cl. 99—136)

This invention relates to frozen confections, and more particularly, concerns confections of the hard candy shell type having a frozen filling.

While ice cream confections are known in the art which have various forms of outer coatings or shells, including chocolate base coatings, pastry coatings, or chewing gum coverings; such coatings or shells have various disadvantages. Thus chocolate is brittle, melts and soils the fingers. Other known coverings or coatings for ice cream fillings are difficult to apply and do not bond too well to the filling.

Accordingly, an object of this invention is to provide an improved frozen confection having an ice cream filling and a hard candy shell which allows the confection to be handled without soiling the fingers; prevents leakage of the filling and wherein a good bond is established between the filling and the shell.

A further object of this invention is to provide an improved method of making frozen confections which includes combining an ice cream type filling with a hard candy shell under conditions which result in a good bond between filling and shell, yet produces an end product in frozen form wherein the filling is maintained in excellent edible form.

Other objects of this invention will in part be obvious and in part hereinafter pointed out.

Figure 2:
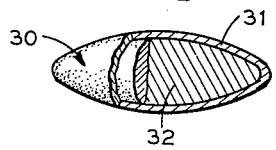

In the drawing:

Fig. 1 is a schematic showing of the equipment for making the frozen confection of the instant invention; and Fig. 2 is a sectional view of a frozen confection embodying the invention.

Essentially, frozen confections are produced in accordance with the invention, by first forming a sugar-glucose mixture into a plastic, pulled sheet; such sheet being at an elevated temperature and introduced into a conical batch roller which forms the plastic mass into a tube which is fed continuously while a prepared filling mix is introduced into the freshly formed tube.

The filling mix is prepared substantially as an ice cream mix except that stabilizers and thickeners are added in amounts to substantially increase the viscosity of the mix. The mix is at an elevated temperature when the same is introduced into the tube and the filled tube is fed through a device adapted to mold the tube into successive portions of predetermined shape, the portions remaining interconnected.

Thereafter the moving filled tube is progressively cooled down in successive stages to about 40° F. and thereafter passed through a freezing zone where the filling is converted to frozen form and the frozen product having a brittle, hard candy shell breaks up into units on a conveyor which is vibrated.

Thus, as shown in Fig. 1, 1 and 2 are containers for sugar and corn syrup respectively, which are combined in proper proportions in a dissolving pan 3. The liquid mixture is fed to container 4 from which it is passed by a pump 5 to a continuous vacuum cooker 6, having a vacuum pump 7 associated therewith. The boiled sugar-syrup mass is received in a pan 8, from which the same is placed on kneading and mixing tables 9. One of such tables may be used to cool the mass to a plastic consistency while flavoring and color may be admixed with the kneaded mass.

Another table may be heated to maintain the kneaded mass of sugar at the proper temperature until needed for further processing. Preferably, the sugar mass is kept at about 165° F.

At 10, 11 are cooking pans adapted to prepare the edible fillings for the confection. Such pans are used in alternation to avoid any delay in the continuity of the procedure. The filling mixture from pan 10 or 11 is conveyed by a pump 12 to a conical batch roller 13 of conventional design, the filling being supplied to the axial conduit of such roller. A flattened sheet of sugar mass taken from a heated table 9 is introduced into the roller 13 to be converted into a continuous tube about said axial conduit, not shown.

Thus, at the delivery end of batch roller 13 there passes therefrom a continuous tube of sugar mass enclosing a filling from pan 10 or 11. The continuously moving tube is passed through a scaling device 14 which reduces said tube to uniform outside diameter, which then passes to a conventional candy molding device 15 having appropriate dies for continuously impressing or transversely pinching the moving tube to convert the same into a series of connected units of determined configuration corresponding to the dies of device 15. Such units are of typical candy or candy bar size.

The thus molded candy in strip form is fed to a cooling chamber 16 having an endless conveyor for transporting said strip, with an exhaust fan 17 connected to zone 16 to draw air therethrough, thereby reducing the temperature of said strip from about 150° F. to about 80° F. The thus cooled strip then passes through a second cooling chamber 18 having a fan 19 connected thereto and adapted to circulate air of a temperature which will further reduce the temperature of the moving strip to about 40° F.

The cooled, filled strip then passes through a freezing channel 20 which is provided with refrigerating devices 21 so as to further reduce the temperature of the moving strip to about 14° F. After leaving channel 20 on a conventional wire belt conveyor 22, the strip passes to a vibrating conveyor 23 where the strip breaks into units. Such individual units are scraped onto a conveyor 24 extending at right angles to conveyor 23, the units being passed to a wrapping station 25, where the same are individually wrapped by devices well known in the art. The wrapping may take place at a room temperature of about 55° F.

The filling mix prepared at pans 10, 11 may be of the ice cream type, comprising milk, cream, eggs, corn syrup, vegetable and animal fats, sweetening agents, stabilizing agents, flavorings, fruit, homogenizing and emulsifying agents, and the like. However, the formulations used must have a relatively high viscosity, of the order of at least from about 28 to about 33° Beaumé.

By way of illustration, one suitable ice cream mix comprises 6 lbs. sweet condensed milk; 4.5 lbs. powdered sugar; 15 lbs. 33% fresh cream; 12 oz. egg yolk powder; 0.5 oz. vanillin; 24 grams of stabilizer known as Statex comprising a mixture of cellulose and vegetable gums, dextrose and fatty acid esters; 12 grams of mixed mono and diglyceride emulsifier known as Drew Mulse, and 12 grams of a thickener of animal origin known as Gelosene. The vanillin can be replaced by coffee or chocolate to vary the flavor of the mix.

Other formulations including various ice cream mix ingredients such as corn syrup, vegetable and animal fats, sweeteners, fruit, fruit pulp, nuts, flavors, colorants may be utilized, providing sufficient thickening agent is used to produce a high viscosity mix. It was found that with such high viscosity mixes, the hot mix was highly compatible with the hot sugar mass and produced an excellent bond therebetween. Furthermore, in the finished, frozen product, indicated at 30 in Fig. 2, the outer candy shell 31 was leakproof and provided an excellent covering for the frozen ice cream core 32.

It is understood that various emulsifying, homogenizing and thickening agents, known in the art, may be used in forming the filling for the frozen confection of this invention, including products having a cellulosic base, or derived from pectin, gelatine, agar-agar, and the like. Thus, the egg yolk powder may be replaced by glyceryl monostearate, in the proportion of 0.5 lb. per 100 lbs. mix.

As various changes might be made in the embodiments of the invention herein described without departing from the spirit thereof, it is understood that all matter herein disclosed shall be deemed illustrative and not limiting except as set forth in the appended claims.

I claim:

1. The method of making a frozen confection comprising forming a thin walled, sugar candy shell pliant at elevated temperature, providing a high viscosity edible cream mix at elevated temperatures, totally enclosing said mix with said pliant candy shell, cooling the enclosed mix, and then freezing the enclosed mix to bond the frozen mix to said candy shell and convert said candy shell to brittle form.

2. The method of claim 1 wherein said enclosed mix is cooled from about 150° to about 40° F. before freezing.

3. The method of claim 1 wherein said mix has a density of from about 28 to about 33° Beaumé.

4. The method of making a frozen confection comprising forming a tube from sugar at a temperature of about 165° F., continuously introducing into said tube a high viscosity edible cream mix at a temperature of about 150° F., cooling said filled tube to about 40° F., and then freezing said filled tube.

5. The method as in claim 4 and further including the step of transversely pinching said filled tube at spaced intervals before the cooling step.

6. The method of making a frozen confection comprising forming at elevated temperatures a plastic sheet of sugar composition, rolling said plastic sheet to form a continuous tube, continuously introducing into said tube at elevated temperature a filling of stabilized edible cream having a viscosity of from about 28° to about 33° Beaumé, transversely pinching the filled tube at spaced intervals, continuously moving the filled tube through a cooling zone and then through a freezing zone.

7. The method of claim 6 wherein said filling comprises condensed milk, cream, sugar, egg yolk powder and flavoring.

References Cited in the file of this patent

UNITED STATES PATENTS

| | | |
|---|---|---|
| 1,652,789 | Moore | Dec. 13, 1927 |
| 1,719,931 | Hall | July 9, 1929 |
| 2,191,352 | Oprean | Feb. 20, 1940 |
| 2,774,313 | Lombi | Dec. 18, 1956 |